United States Patent [19]

Jamzadeh

[11] Patent Number: 5,523,849
[45] Date of Patent: Jun. 4, 1996

[54] OPTIMIZING EDGE ENHANCEMENT FOR ELECTROGRAPHIC COLOR PRINTS

[75] Inventor: Feraydoon S. Jamzadeh, Fairport, N.Y.

[73] Assignee: Eastman Kodak Company, Rochester, N.Y.

[21] Appl. No.: 78,539

[22] Filed: Jun. 17, 1993

[51] Int. Cl.⁶ .............................. H04N 1/29; H04N 1/46; H04N 1/58; G06K 9/36
[52] U.S. Cl. .................... 358/298; 358/300; 358/515; 358/532; 382/167; 382/266
[58] Field of Search .................... 358/298, 296, 358/300, 302, 443, 515, 518, 530–535; 382/162, 167, 254, 256–258, 260, 264, 266–269; 347/131, 232

[56] References Cited

U.S. PATENT DOCUMENTS

| | | | |
|---|---|---|---|
| 4,051,536 | 9/1977 | Roetling | 358/298 |
| 4,111,823 | 9/1978 | Kobayashi et al. | 430/110 |
| 4,571,635 | 2/1986 | Mahmoodi et al. | 382/266 X |
| 4,618,990 | 10/1986 | Sieb, Jr. et al. | 382/280 |
| 4,633,327 | 12/1986 | Roetling | 358/283 |
| 4,641,244 | 2/1987 | Wilson et al. | 382/266 X |
| 4,730,221 | 3/1988 | Roetling | 358/298 |
| 4,926,251 | 5/1990 | Sezikawa et al. | 358/535 |
| 4,953,114 | 8/1990 | Sato | 382/50 |
| 4,968,578 | 11/1990 | Light et al. | 430/126 |
| 4,969,053 | 11/1990 | Outa et al. | 358/458 |
| 4,992,831 | 2/1991 | Kunishi | 355/245 |
| 5,045,952 | 9/1991 | Eschbach | 358/447 |
| 5,054,100 | 10/1991 | Tai | 382/47 |
| 5,122,843 | 6/1992 | Yokoyama et al. | 355/326 |
| 5,126,839 | 6/1992 | Sugiura | 358/80 |
| 5,134,667 | 7/1992 | Suzuki | 382/266 X |
| 5,166,810 | 11/1992 | Sorimachi et al. | 358/462 |
| 5,251,267 | 10/1993 | Kawamura | 358/443 X |
| 5,331,442 | 7/1994 | Sirimachi | 358/532 |

OTHER PUBLICATIONS

William K. Pratt, "Edge Crispening", *Digital Image Processing*, pp. 322–325.

Rafael C. Gonzalez and Paul Wintz, "Image Enhancement", *Digital Image Processing*, 1977, pp. 154–163.

*Primary Examiner*—Peter S. Wong
*Assistant Examiner*—Eric Frahm
*Attorney, Agent, or Firm*—Norman Rushefsky

[57] ABSTRACT

In an electrographic color printing process in which a series of edge-enhanced color separation images are sequentially transferred, in registration, from a recording element to a receiver sheet, the level of edge enhancement applied to each color separation image is gradually reduced so that the fast transferred image receives the greatest amount of edge enhancement, and the last-transferred image receives the least. The effect of this reduction in edge enhancement from image-to-image is a reduction in the graininess of the composite color print.

36 Claims, 6 Drawing Sheets

|  | IMAGES | TEXT & LINE ART |
|---|---|---|
| SEPARATION #1 | $K_{I1}$ | $K_{T1} > K_{I1}$ |
| SEPARATION #2 | $K_{I2} < K_{I1}$ | $K_{T2} < K_{T1}$ |
| SEPARATION #3 | $K_{I3} < K_{I2}$ | $K_{T3} < K_{T2}$ |

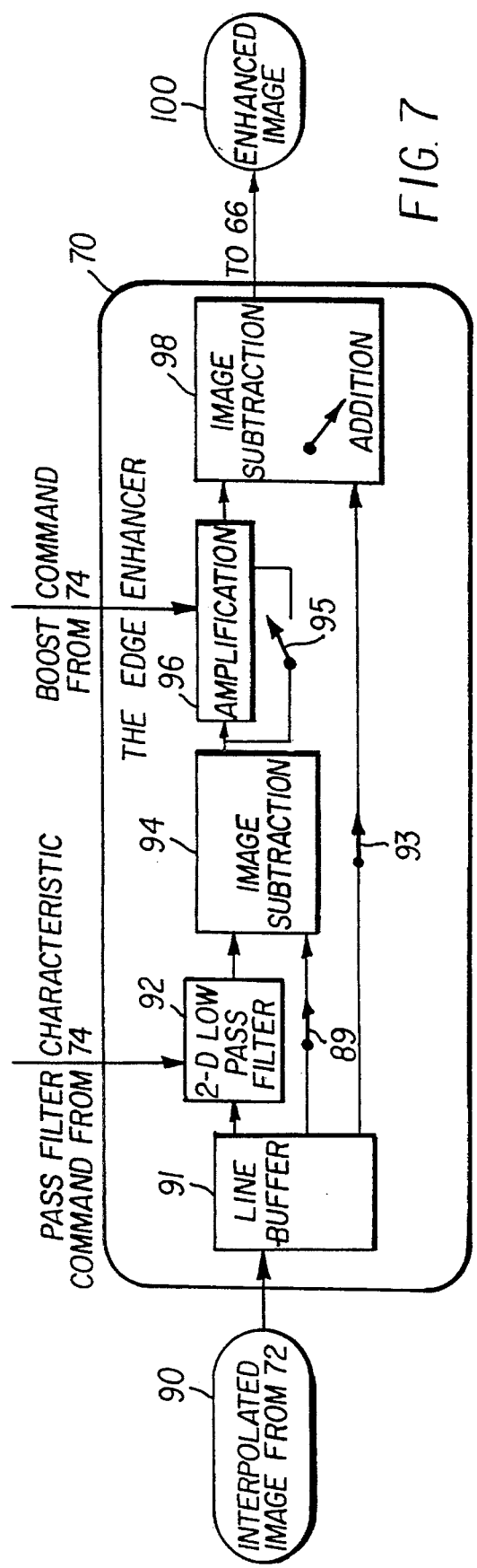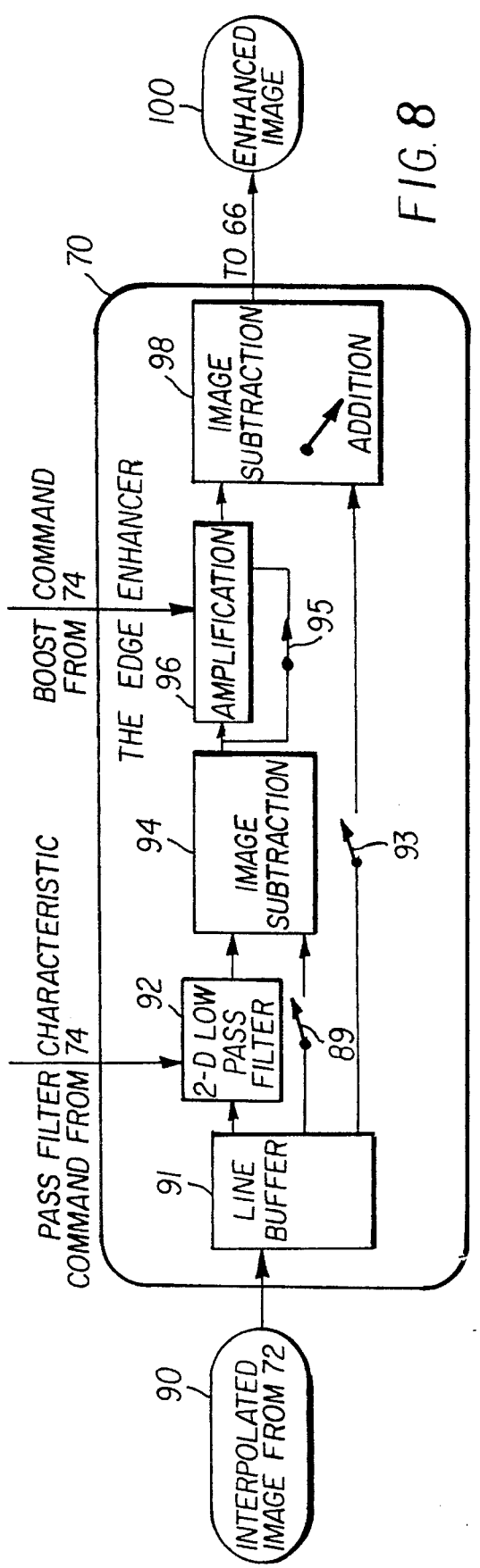

OPTIMIZING EDGE ENHANCEMENT FOR ELECTROGRAPHIC COLOR PRINTS

BACKGROUND OF THE INVENTION

1. Field of the Invention

The present invention relates to the field of color electrography. More particularly, it relates to an apparatus and method for reducing the grainy appearance of electrographically-produced color prints.

2. Description of Prior Art

The commonly assigned U.S. Pat. No. 4,994,827, entitled MULTICOLOR IMAGING METHOD AND APPARATUS; U.S. Pat. No. 5,047,791, entitled ELECTROSTATIC COLOR PRINTING APPARATUS and U.S. Pat. No. 5,151,717, entitled IMAGING METHOD AND APPARATUS USING DISCRETE SHEETS, all issued to Feraydoon S. Jamzadeh et al, disclose electrophotographic printing apparatus for producing full color prints of photographic quality. Such an apparatus comprises an electronic scanner for scanning the individual frames of a color negative film to convert the color image information to electronic form. In scanning a single frame of plural colors, three or four video signals are produced, each representing the color image information in a different portion of the spectrum (e.g., red, green and blue). Each of such video signals is stored in memory and, prior to being used to control the intensity of a laser scanner used to record color-separated image information on a photoconductive recording element, is electronically processed to effect, for example, edge enhancement "sharpening" or "crispening" of the image information. Various edge-enhancing techniques are well known; see, e.g., "Digital Image Processing" by William K. Pratt, published by John Wiley & Sons (1978).

In the above color printing process, a series of electrostatic images are sequentially recorded on the photoconductive recording element, each image representing color-separated image information. These electrostatic images are then developed with toner particles of different color (e.g., cyan, magenta, yellow and sometimes black), and the resulting toner images are transferred, one after the other, to a thermoplastic-coated paper receiver sheet. The edge enhancement, referred to above, has the effect of boosting the image density at the edges of all image patterns, the effect being a much sharper and crisper looking print.

In the above-mentioned printing process, each successive transfer of toner images becomes increasingly more difficult with each color-separated image. It will be appreciated that after the first color-separated toner image has been transferred to the thermoplastic surface of the receiver sheet, as applicable to electrostatic transfers, the untoned surface area on the receiver is smaller for the second toner image than it was for the first. Of course, after the second toner image has been transferred, there is even less untoned surface area on the receiver for the third toner image than there was for the second image. Since the toner particles comprise a thermoplastic material (see U.S. Pat. No. 4,968,578 for further description of how heating the receiver sheet to a degree sufficient to soften the toner is practiced) having a melting point substantially higher than that of the receiver's thermoplastic coating, toner will more readily transfer to the receiver's thermoplastic surface than to the surface of the previously deposited toner particles. Thus, the transfer efficiency of the second toner image is somewhat less than that of the first image, and the transfer efficiency of the third toner image is somewhat less than that of the second, and so on. As the transfer efficiency declines, the graininess of the image increases. Applying edge enhancement to a grainy image only acts to amplify the graininess of the image.

SUMMARY OF THE INVENTION

In view of the foregoing discussion, an object of this invention is to reduce the graininess effect in color prints produced by the above-described process or similar processes.

The above object is achieved by an apparatus and method for gradually reducing the level of edge enhancement for each of the successively formed color separation images. For example, the edge enhancement of the second color separation image may only be half that of the first color separation image, and that of the third color separation may be only half that of the second color separation. The amount of edge enhancement variation may be determined experimentally, depending on the image appearance desired and the toner particle size used in conjunction with each separation.

The present invention provides an image-forming apparatus adapted to produce plural color separations on a receiver. The apparatus comprising means for effecting edge enhancement and means for adjusting the amount of edge enhancement from one color separation to another in a single image.

The present invention provides an image-forming apparatus comprising a movable imaging member to bring the periphery of said imaging member past a series of electrographic stations which include charging, exposing and toning stations to create a series of color separation toner images and transfer station for transferring said images in registration to a receiver to create a multi-toned image. The apparatus including a means for scanning an original continuous tone image to provide image data for each color separation and electronic exposure means for forming a series of electrostatic separation images from said image data on the movable imaging member for each color separation. The apparatus further includes means for transferring the series of toner images in registration to a single receiving sheet to create a multi-color image thereon and variable means for effecting the amount of edge enhancement applied to said image data for each scanned separation.

The present invention further provides a method of forming an image comprising a movable imaging member, the periphery of said imaging member is moved past a series of stations for the steps of charging, exposing and toning to create a series of color separation toner images and then transferring the separation images in registration to a receiver to create a multi-toned image, said method including the following steps. Scanning an original continuous tone image to provide image data for each color separation and exposing the image data on the movable imaging member for forming a series of electrostatic separation images from the image data for each color separation. Transferring the series of toner images in registration to a single receiver to create multi-color images thereon and varying the amount of edge enhancement applied to the image data for each scanned separation.

The invention and its advantages will be better understood from the ensuing detailed description of the preferred embodiment, reference being made to the accompanying drawings.

BRIEF DESCRIPTION OF THE DRAWINGS

FIG. 7 is a detailed block diagram of the edge enhancement block shown in FIG. 2 with all of the switches adjusted to process halftone images;

FIG. 8 is a detailed block diagram of the edge enhancement block shown in FIGS. 2 and 3 with all the switches set to process halftone images.

DETAILED DESCRIPTION OF PREFERRED EMBODIMENTS

Figure 1:
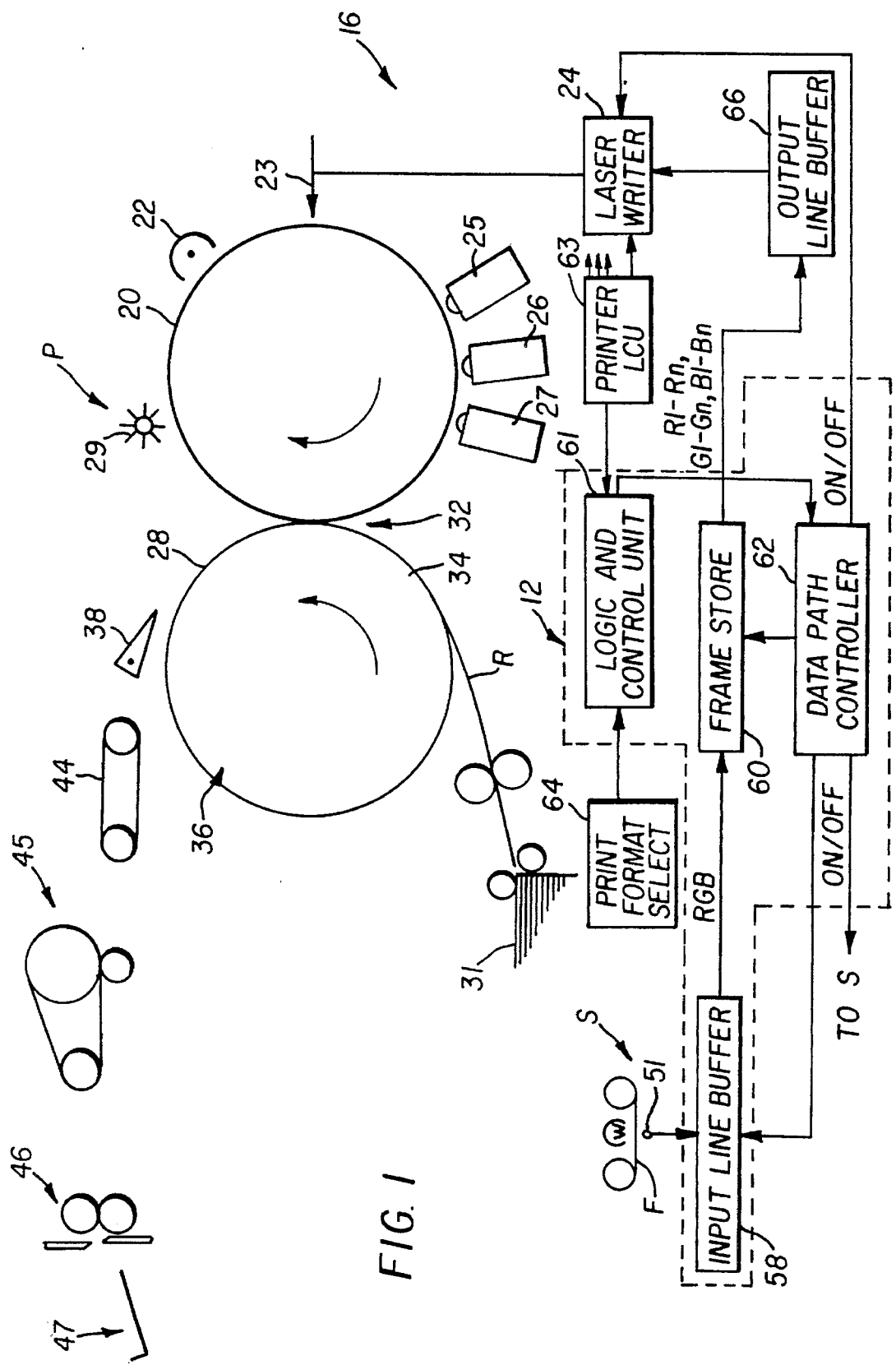
FIG. 1 is a schematic illustration of a color electrophotographic printer of the type in which the invention finds utility.

The following discussion of electronic printing is presented as general background to enable a full understanding of the instant invention. In order to utilize electronic printing for reproducing images from an array of multicolored images contained on a filmstrip or the like, the filmstrip must be scanned by an electronic color scanner which can conventionally include, for example, a color-responsive CCD (such as shown in U.S. Pat. Nos. 4,638,371, or 4,639,769). The scanner operates to produce, line-by-line and pixel-by-pixel (a pixel defined as a picture element), electronic signals representing the color content of each image contained in the scanned filmstrip. The signals are stored in a framestore (such as described in U.S. Pat. No. 5,175,628, issued Dec. 29, 1992 in the name of Jamzadeh et al) to enable subsequent driving of an exposure device and the electronic printer.

Electronically produced signals are also capable of being used for storage of an array of multicolored images (contained in an original filmstrip or the like) on alternative storage media such as a still video floppy or a video disc. Image regeneration devices are then required to readout the stored signals from the alternative storage media for display, for example, on a CRT or a standard television set. It is desirable to make a print on a single print receiver sheet for a complete array of filmstrip frame images so that such images are readily viewable. Such a single print receiver sheet bearing the complete array of filmstrip images is referred to as an "index print". That is, when providing prints for a filmstrip containing an array (i.e., series) of images, or when an array or images is stored on alternative storage media, it is advantageous to provide the customer with a single sheet (the index print) containing all of the images, included with the image prints or the alternative storage media.

The production of prints, including the index print, for an array of image frames contained on a filmstrip (or video disc) or the like is accomplished by pre-scanning, add low resolution, an array of multicolor images contained on a frame of a filmstrip or the like. Information data, contained during the low resolution pre-scan of the scene content of the respective image frames, and additional information data of at least one of where frames of the array are located on the filmstrip, what type of filmstrip is being scanned, the total number of frames on the filmstrip, and what are the conditions of each frame, are stored. Look-up-tables based on the stored information data are defined, and the stored information data is processed with the defined look-up-tables to produce prints of the array of multicolor images. Prints may thereafter be produced at high resolution, on respective print receiver sheets or at low resolution, as an index print, on a single print receiver sheet and the additional information data may be printed in association with the respective image prints on the individual print receiver sheets or on the index print.

The information data of at least the scene content of the images to be printed, obtained during the low resolution pre-scan of said images in the manner described above is additionally utilized to carry out the optimization of the electronic printing process. Referring to the accompanying drawings, FIG. 1 generally schematically illustrates an electrophotographic color printer capable of producing a plurality of multicolor image frames on a single print receiver sheet. The electrophotographic color printer, designated generally by the letter P, is basically of the type set forth in U.S. Pat. No. 5,040,026, and is described below in sufficient detail for a complete understanding of this invention. Of course, the color printer could alternatively be, for example, a color ink-jet printer, a color thermal printer, or any other suitable color electronic printer.

The electrophotographic color printer P comprises a reusable image recording element, for example, a photoconductive recording member in the form of a drum 20. The drum 20 is rotated by a motor, not shown, in a clockwise direction (as viewed in FIG. 1) past a series of processing stations, all of which are well known in the art. These stations include a charging station 22 which operates to uniformly charge the photoconductive surface of the drum 20. The drum 20 is then exposed by laser beam 23 which is controlled by the laser writer 24. Laser beam 23 imagewise exposes the uniformly charged surface to create developable latent electrostatic images thereon. The exposure station may comprise a conventional LED printhead, an ion-depositing head, or as schematically shown, a laser writer 24.

As drum 20 rotates, the intensity of the output beam of laser writer 24 is modulated with color-separated image information data, whereby a series of latent electrostatic images are produced on the drum surface, each representing a color-separated image of the ultimately desired multicolor print. The series of electrostatic images on drum 20 is rendered visible with different color marking particles (e.g., cyan, magenta and yellow toner), by development stations 25, 26 and 27, respectively, to produce a series of related toner images. These color-separated toner images are then transferred in registration to the print receiver sheet R carried on the periphery of a transfer drum 28. The photoconductive drum 20 is subsequently cleaned at a cleaning station 29 and recycled through the electrophotographic image-forming process.

Print receiver sheets R are fed, seriatim, from a sheet supply 31 to an image-transfer station 32 defined by the nip between drum 20 and transfer drum 28. As each sheet approaches the image-transfer station 32, it is secured to the transfer drum 28 by vacuum means, gripping fingers or other suitable mechanism. For example, the leading edge of the sheet can be secured to the transfer drum by vacuum through a row of vacuum ports 34 and the trailing end by vacuum through a row of vacuum ports 36. During each rotation of the transfer drum, one color-separated toner image is transferred to a receiver sheet, for example, by heating the receiver sheet to a degree sufficient to soften the toner and tack the toner to the receiver sheet (see, for example, U.S. Pat. No. 4,968,578, issued Nov. 6, 1990, in the name of Light; U.S. Pat. No. 4,927,727, issued May 22, 1990 in the name of Rimai et al; and U.S. Pat. No. 5,021,835, issued Jun. 4, 1991 in the names of Johnson et al).

After the transfer drum 28 has made three (four) revolutions and three related color-separated toner images (plus a black image if a fourth revolution is employed) have been transferred, and superimposed registration, to the surface of a print receiver sheet R, the leading edge of the receiver sheet is stripped from the transfer drum 28 by stripping mechanism 38. The print receiver sheet R is transported by further rotation of the transfer drum 28 onto a sheet transport 44 which carries it to a fusing device 45 where the transferred images are fixed to the sheet by heat and/or pressure, for example. The print receiver sheet R is then cut by any suitable cutting mechanism 46 to provide a plurality of smaller prints each containing the reproduction from a single multicolor image frame. The resultant prints are collected in a tray 47 or more sophisticated print collecting device of any well known type.

In the electrophotographic color printer P apparatus shown in FIG. 1, each print receiver sheet is of a relatively large size, for example, 12 inches by 18 inches. Such a print receiver sheet R can provide nine 4×6-inch print images exposed edge-to-edge with no waste. As mentioned above, this format is commonly referred to as the "9-up" format. The other print sizes will produce some waste with a 12×18-inch print receiver sheet. A "4-up" format is formed on a 12×18-print receiver sheet one in which four 5×7-inch print images are formed on a 12×18-inch print receiver sheet. A "2-up" format is one in which two 8×10-inch print images are The input signals to the laser beam 23 are provided by conventional electronic color scanner S which includes a series of color-responsive CCDs (such as shown, for example, in aforementioned U.S. Pat. Nos. 4,638,371 and 4,639,769). Scanner S operates the scan in original multi-color images as the filmstrip F is moved past the scanner by well known drive mechanism (not shown). The scan is accomplished line-by-line and pixel-by-pixel, to produce three separated-signals, R, G and B representing the color content of each of the scanned image frames in three spectral regions, i.e., the red (R), green (G) and blue (B) spectral regions. These R, G and B color-separated signals are produced substantially simultaneously and; as they are produced, they are fed to a frame store 60 (discussed below) via an input line buffer 58 of an image data manager 12. The latter serves to buffer a few lines of image data to account for any electronic protocol (SCSI communications) latencies at the scanner/frame store interface, and look-up-table leads inside the filmstrip scanner S.

A logic and control unit (LCU) 61 operates through a data path controller 62 to control the flow of data into and out of the frame store 60 and manage the whereabouts of data in the frame store (i.e., provide a bookkeeping function). The LCU 61 also cooperates with a logic and control unit (LCU) 63 for the electrophotographic color printer P. The LCU 63 receives inputs from various portions of the electrophotographic color printer, including encoders (not shown) associated with the photoconductive and transfer drums (20 and 28, respectively), and transducers associated with the various processing stations to manage the timing of the entire printing process for such apparatus.

One of the inputs to the LCU 61 is from a print format selector 64, whereby an operator can choose any of several different print sizes. Based on the format selected, the LCU 61 instructs the data path controller 62 to extract both pixels from the frame store 60 in the appropriate format required to produce the appropriate format image on a print receiver sheet R. For example, if 4×6-inch prints (i.e., "snapshots") are desired, the LCU 61 instructs the data path controller to extract the stored pixels in the format required to produce the 9-up format on the print receiver sheet. Similarly, if 5×7-inch proofs are desired, the LCU 61 commands data path controller 62 to extract those prints from memory in the required format to print images in the 4-up format. In either case, the frame store 60 is readout in a sequence required to produce multiple color-separated images on the photoconductive drum 20. The data read-out from the frame store 60 is applied to the laser writer 24 via an output line buffer 66 which serves to buffer a few lines of image information to account for latencies in the laser scanner/recording element interface, and data path image manipulation needs.

The low resolution pre-scan of the scene content of an image frame on the filmstrip F, accomplished in the order of 128×192 pixels, has been found sufficient to provide enough scene content data information to enable a recognizable print of an image from an array of image frames on a filmstrip therein. Also, such a low resolution pre-scan provides the necessary additional information data required for the LUT's needed for subsequent high resolution scanned printing of the filmstrip image frames. At this low resolution, the total data storage for an array of filmstrip image range is on the order of 20K bytes for each separation, well within the data storage capacity of commonly available, relatively inexpensive computer systems.

To utilize the data information obtained during the low resolution pre-scan for optimizing the printing process for an electronic color printer such as the printer P, information data particularly related to at least the scene content of the images to be reproduced are analyzed in the image data manager 12 by the LCU 61 to calculate the various operating parameters to determine the required process functions for the printer. Based on the determined required process functions, such functions are set to optimize the printing process. Particularly, the life of the photoconductive recording member may be maximized, marking particle consumption may be readily accommodated and substantially evenly accomplished, and the thermal requirements may be accurately predicted and efficiently provided for. Specifically in this disclosure, pre-scan data is used to reduce the graininess of the images to be printed.

USE OF EDGE ENHANCEMENT WITH CONTINUOUS TONE IMAGES

Figure 2:
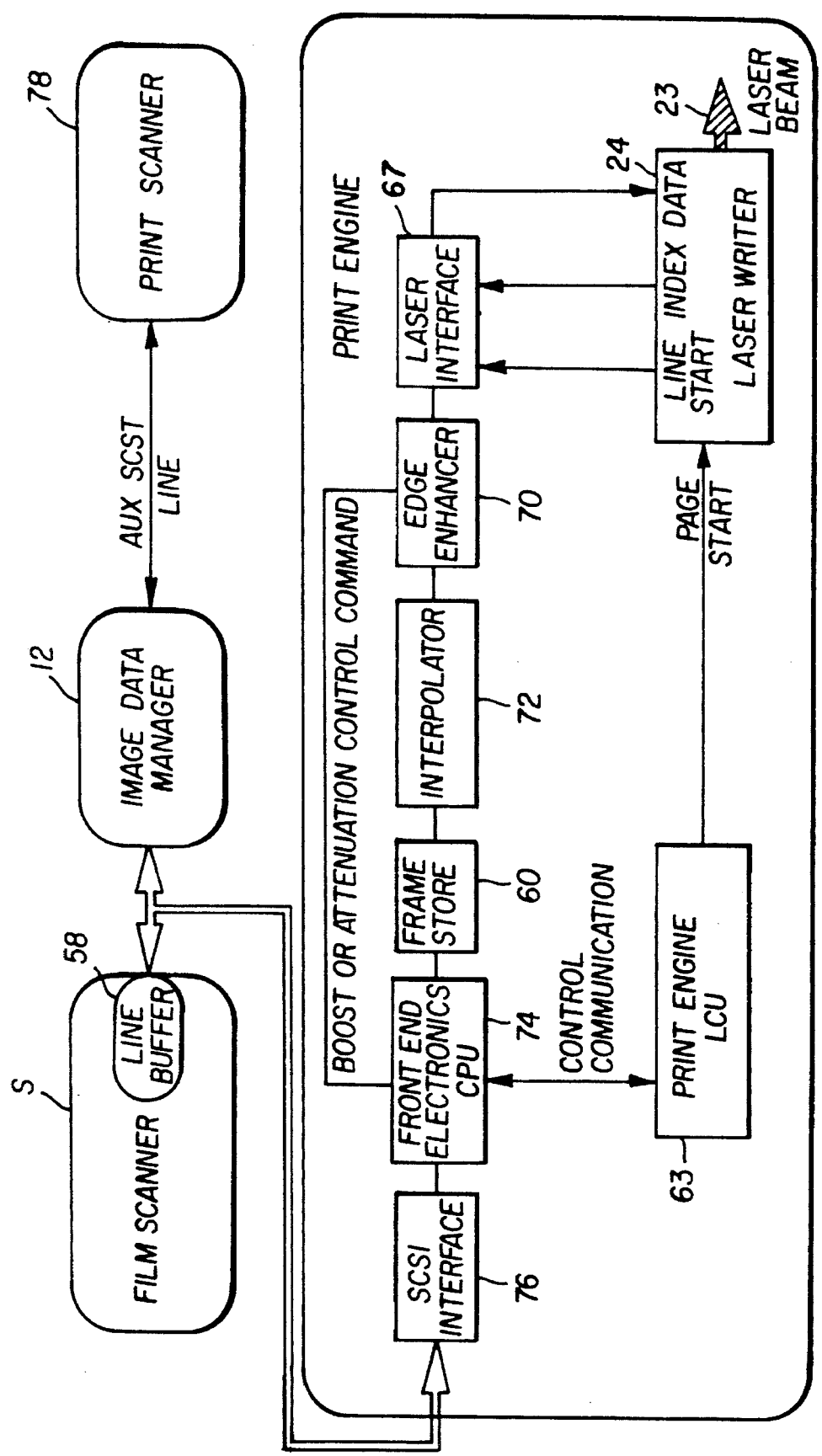
FIG. 2 is a system block diagram of the scanning and printing systems of the apparatus shown in FIG. 1.

FIG. 2 shows the data path for the images on the system. The color film scanner S is capable of scanning any color or black and white film but most frequently is used in conjunction with 35 mm color film. Image data manager 12 analyzes the pre-scan data and determines the type and length of the film being scanned. It also computes the look-up table values used in the main scan and sends the required information to the scanner S. The image data from the color-responsive film scanner S is routed directly to the SCSI interface 76 in the print engine. The SCSI interface 76 provides the proper connection to the CPU 74 which is the electronic front end and distinguishes image data from command information. The image information is directed to frame store 60 for temporary storage, while the command information is sent to the print engine LCU 63 or handled by CPU 74. Image data is stored in frame store 60 until proper print format is established (i.e., 4-up, 9-up, etc.). Raster lines of the print are read out of frame store 60 line-by-line and sent to the interpolator 72. Interpolator 72 will increase the resolution of the image data so that the proper image size could be reproduced, for example, 9-up is printed on "12× 18" paper for nine 4"×6" prints. The interpolated raster lines are then directed to the edge enhancer 70. The amount of boost or sharpening applied by edge enhancer 70 is controlled by CPU 74 via the boost control command line. The amount of boost is based on information received by CPU 74 as to the type of film being scanned by the scanner S and that information is sent as command information by image data manager 12. Film type has a direct effect on the amount of enhancement because it is based on the amount of grain in the film. Enhanced raster lines are buffered and synchronized through the laser interface 67 to the laser writer 24. Laser beam 23 is then used to expose on the photoconductive drum 20 and form a latent image.

Figure 3:
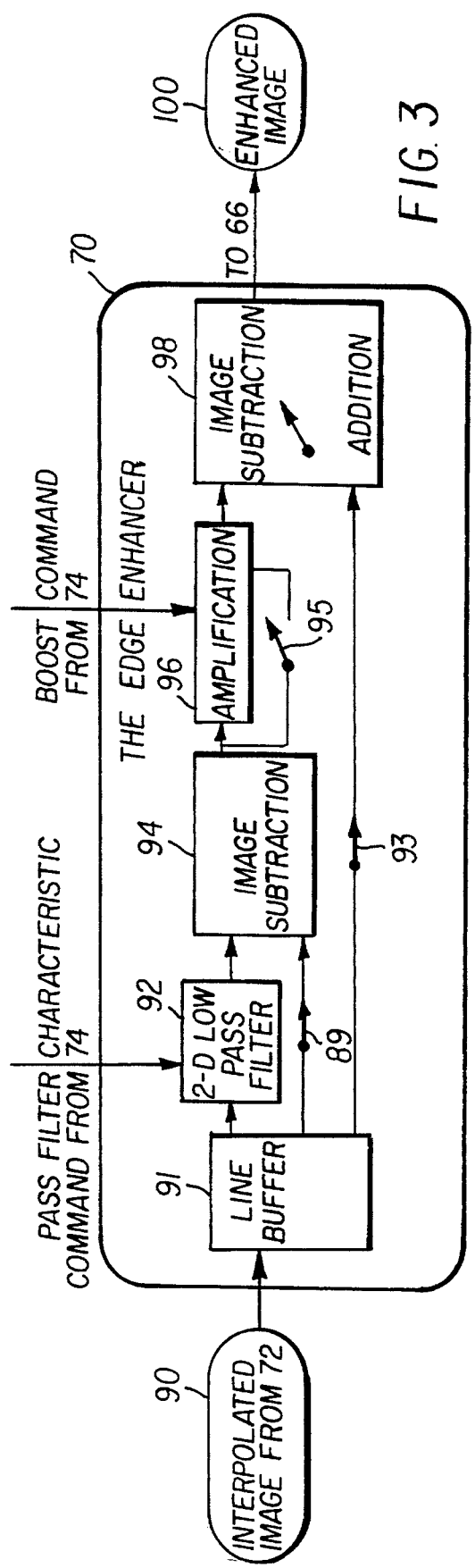
FIG. 3 is a detailed block diagram of the edge enhancement block shown in FIG. 2 with all the switches set to process continuous tone images.
Figure 4:
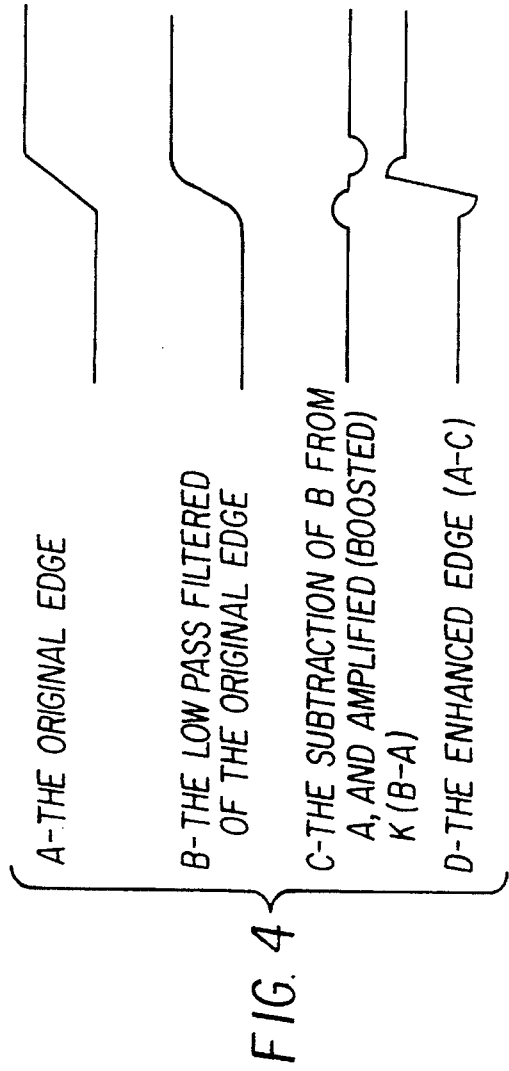
FIG. 4 is a series of waveforms illustrating an algorithm for edge enhancement of the images produced in the FIG. 1 apparatus.

There are a number of methods to perform edge enhancement and unsharp masking is a popular method and is described in the embodiment illustrated in FIG. 3 showing in greater detail edge enhancer 70. One advantage associated with unsharp masking is that more control can be obtained over the image because the cut-off frequency of the low-pass filter can be adjusted as well as the gain of the amplifier or "boost" as it is commonly called.

In general, the amount of edge enhancement required is determined by the size of the toner particles used in conjunction with each separation. Larger toner particles make the image look more grainy. By reducing the amount of edge enhancement, the graininess effect is reduced. In transferring multi-color separations of a color image, generally, the last color separation is the most difficult to transfer resulting in a more grainy separation. Accordingly, less edge enhancement will reduce the grainy appearance. The amount of edge enhancement is controlled by what is commonly called "boost".

There are two conditions associated with color print making that can benefit from the teachings of the present invention, that of actively controlling the amount of edge enhancement used to reduce graininess. The first condition exists when the toner particle size of each color is different from the toner particle size of the other colors. The second condition is when the toner particle sizes used with all the color separations are the same.

Different size toner particles are used for different colors to enhance the transfer process. It is well known that when transfer efficiency goes down, the images are grainier and the use of any edge enhancement only enhances the grain. As separations are transferred onto thermoplastic layers of the paper, available surface locations for the next color toner particles is reduced. The result is poorer transfers for separation number two and a worst transfer efficiency for separation number three. However, transfer efficiency improves as toner size is increased. Therefore, to compensate for poor transfers of second and third-separations, larger and larger toner particles are used for the second and third color separations. But the use of a larger particle size in a toner results in grainier separations. The present invention controls the amount of edge enhancement boost to compensate for any increase in graininess. By controlling the amount of boost, one can prevent making unacceptable grainy prints by reducing the "boost" or level of gain for separations that use larger toner particles.

When similar size toner particles are used in the different separations to create a color image, similar results occur. The second and third separations do not transfer as efficiently as the first separation. This results in noise and an increase in grain in both the second and third separations. An improvement in each separation image can be realized by controlling and reducing the edge enhancement boost in each of the subsequent separations to reduce the effect of the grain in the image. It should be noted that the amount of boost reduction will more than likely be greater than in the first condition discussed above.

The efficiency of the transfer stage in a printer is highly dependent on the particle size of the toner. In general, larger toner particles transfer easier and, therefore, the transfer efficiency will be higher. The fundamental reason for this fact is the increase of the surface adhesion forces which are based on the cubed power of the increase of particle diameter compared to the increase of electrostatic transfer forces by the square power of the particle diameter. U.S. Pat. No. 4,968,578, entitled METHOD OF NON-ELECTROSTATICALLY TRANSFERRING TONER, in the name of Light et al, issued Nov. 6, 1990 explains the details for transferring smaller toner particles. With better transfer efficiencies, the chance of introducing graininess into the images by this transfer process is reduced.

Use of larger toner particles results in increased graininess of images inherently. The reason is that in this case, the image is comprised of larger toner particles and the image will reflect the size of these particles in grain size that forms the image. A compromise is made between the amount of improved transfer efficiency and the amount of increased graininess, both because of larger toner particles. Under these circumstances, the amount of boost of the edge enhancement circuit is reduced as subsequent colors are exposed for two reasons: (1) increased graininess because of larger toners, (2) increased graininess because of difficulty to transfer subsequent colors.

Figures 5, 6:
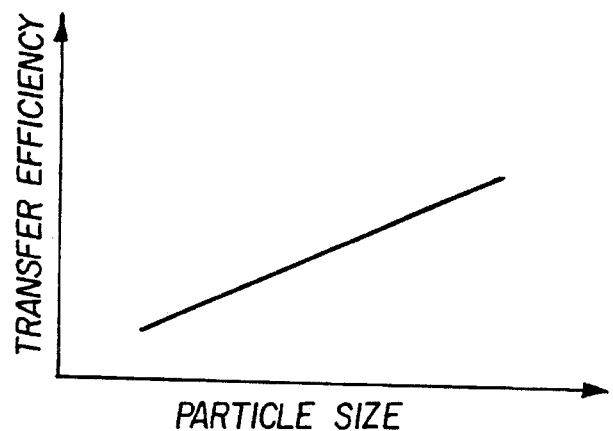
FIG. 5 is a boost table illustrating the amount of amplification required for different images and separations.
FIG. 6 is a graph showing the relationship between toner particle size versus transfer efficiency.

FIG. 6 graphically illustrates the relationship of toner particle size versus transfer efficiency.

FIG. 3 illustrates a typical edge signal going through the edge enhancement procedure for continuous tone images. An interpolated image file is sent from interpolator 72 (FIG. 2) to a multi-line buffer 91, in edge enhancer 70 for temporary storage of several image lines. The image lines are then sent to a two dimensional low pass filter 92 to smooth out any sharp transitions in the image such as edges. The book published by Texas Instruments entitled "Digital Signal Processing Applications", pp. 27–68 and published in 1986, explains the details of designing digital filters including low pass filters. A low pass filter that could be used for this purpose would be the Texas Instrument Model TMS 320 which is a digital signal processing chip. In the block entitled image subtraction 94, the original image which passes through closed switch 89 is subtracted from the output of the low pass filter 92. The result is then amplified or "boosted" in the block entitled amplification 96 because shunt switch 95 is open. In block 96, every image data point is multiplied by a constant K. For example, if K were 2, then all image points would be multiplied by 2 such that all the binary digits of the data point are shifted to the left by one digit. Next, the product of amplification block 96 is subtracted from the original image which passes through closed switch 93 in image subtraction block 98 with the enhanced image being sent to laser interface 67.

The energy of a typical image is concentrated primarily in its low-frequency components. This is the result of the high spatial correlation among neighboring pixels. The energy of image degradation, for instance, wideband random noise, is typically more spread out in the frequency domain. By reducing the high-frequency components while preserving the low-frequency components, low-pass filtering reduces a large amount of noise at the expense of reducing a small amount of signal.

Low-pass filtering reduces the high-frequency components of noise, but at the same time, it reduces the high-frequency components of the signal. Because the edges or details of an image usually contribute to the high-frequency components, low-pass filtered images often look blurred. Thus, when using low-pass filtering, the trade-off between noise reduction and image blurring should be considered.

The manner in which the level of boost or value of the constant K is determined as follows. To enhance the edges of any image, K must be larger than zero. If K=0, the image is not enhanced and is left untouched. To determine the usable range for K, different types of images were produced with various levels for K. The content of the images varied from images containing low spatial frequency such as sky, sea or farm fields to images containing high spatial frequency like picket fences and tree leaves. In addition, images with vertical and horizontal structures like buildings, streets and lamp posts were also tested with images having curved structures like facial close-ups and pictures of fruits. The overall opinion of several image analysts about these different images with varying amounts of boost established the boost values of the table in FIG. 5. While boost values below 20% (K=0.2 and lower) were judged to be too small and boost values of 40% (K=0.4) and higher were deemed to be too much and produced too much edge enhancement along with unwanted artifacts. Accordingly, the optimum boost factor was set at 33% or K=0.33 for the first separation of all the images.

In order to determine the boost factor for subsequent separations, the images were produced with a fixed boost factor for the first separation and varying the boost settings for the second separations. Again, the images were viewed by image analysts with their combined judgments. Their observations matched the objective measurements in light of the fact that each subsequent separation contained about 5% more grain resulting from less efficient transfers. Therefore, boost factors of 28% and 23% (K=0.28 and K=0.23) were selected as reasonable values for second and third separations, respectively. This was for a film having a speed of ISO 100.

It should be noted that films from different manufacturers and films with different photographic speeds will contain different amounts of grain. Thus, it should be understood that the boost factor requires adjustment depending upon type, speed and manufacture of the film that the images were exposed on. These pieces of information are obtained by analyzing the pre-scan data. In general, the higher the speed of the film, the grainier the images. In accordance with this factor, images from high-speed films will have lower boost factors than will be encountered with lower speed films. Film speed is a factor in determining the boost factor. For this reason, the speed of the film is identified in the film scanner S after pre-scan. Once the film type has been determined that information is sent to the CPU 74 which ultimately establishes the boost factors for edge enhancer 70.

To determine the boost factor for text and line art images, prints with that type of content were produced with varying amounts of boost. As a result, 46% (K=0.46) was selected for the first separation. For subsequent colors, the same procedures set forth above were used with test prints. Similarly, it was found that the same results encountered with pure images were applicable to line an with the boost factor being reduced by 5% for each color separation. Therefore, the selected boosts for text and line art prints were set at 46%, 41% and 36%. Text and line art separations are typically identified and/or produced by Image Data Manager 12. It should be noted that whenever black is used in addition to the three primary colors, one may assume the black separation contains only line art and text. This information is used in CPU 74 to establish the boost factors for edge enhancer 70. Table I illustrates a number of boost levels that were experimentally obtained for both images and text and line art within the boundaries and conditions of the embodiment disclosed here.

TABLE I

|  | Images | Text and Line Art |
| --- | --- | --- |
| Separation #1 | 0.33 | 0.46 |
| Separation #2 | 0.28 | 0.41 |
| Separation #3 | 0.23 | 0.36 |

The question may arise when printing multiple images at the same time, for example, in the 9-up scenario, as to which boost factor would be appropriate. For example, if images from a high grain film and images from a low grain film are being printed on the same 9-up sheet. The architecture of the data path for the system shown in FIG. 2 is designed such that the boost factors can be updated (changed) as frequently as each raster line. Accordingly, if three of the nine images were scanned from ISO 1000 film, the boost factor for the top row of images on the 9-up format, the boost would correspond to the appropriate value for high-speed film. If, however, the images from the high-speed film and lower-speed film were to be printed on the same row in a 9-up sheet, the boost factor would be set based on the grainiest image. If one of the three images in each row of the 9-up sheet came from high-speed film, then the other two images would be enhanced as originally intended, but on the other hand, the first image would not be over enhanced and printed with serious artifacts and substantial graininess.

USE OF EDGE ENHANCEMENT WITH HALFTONE IMAGES

FIG. 7 shows an embodiment of the present invention that can be used with halftone images. The reflection scanner 78 in FIG. 2 can be used to scan any printed image for reproduction. Normally, the images used in reflection scanner 78 are photographs and printed images like postcards, posters and magazine pages. All of these input images are printed using halftoning techniques with the exception of photographs which are continuous tone prints.

If halftoned images are scanned and reproduced without any attempt at modifying the signal, strong beat patterns would form artifacts known as Moire patterns which would appear in the new image. The Moire patterns are the result of beat pattern interference between the halftone frequency and the sampling frequency of the scanner. It has been found that by operating the edge enhancement section in the opposite fashion of that described above would result in normal appearing images being reproduced. This can be accomplished by causing the edge enhancement section to blur the edges in the image when a halftone image is scanned by the reflection scanner 78.

Accordingly, the edge enhancement circuitry is used as a blurring stage to reduce the affects of the dot patterns in the original halftone images. When processing halftone images, the output of the low-pass signal of the edge enhancement section provides the first output of this section. FIG. 7 shows how the edge enhancement circuitry of FIG. 3 operates under these special conditions. The only difference between FIG. 3 is that in the former "image subtraction" is performed at block 98, while "image addition" is now done at that stage. This is the same as using negative boost in amplification block 96 (i.e., negative K values). Another way of putting it is that the image edges are attenuated. The use of negative boost eliminates the need for separate and special circuitry for handling halftone images. By controlling the level or amount of negative boost or attenuation, the amount of blurring that is applied to the images is controlled.

Figure 9:
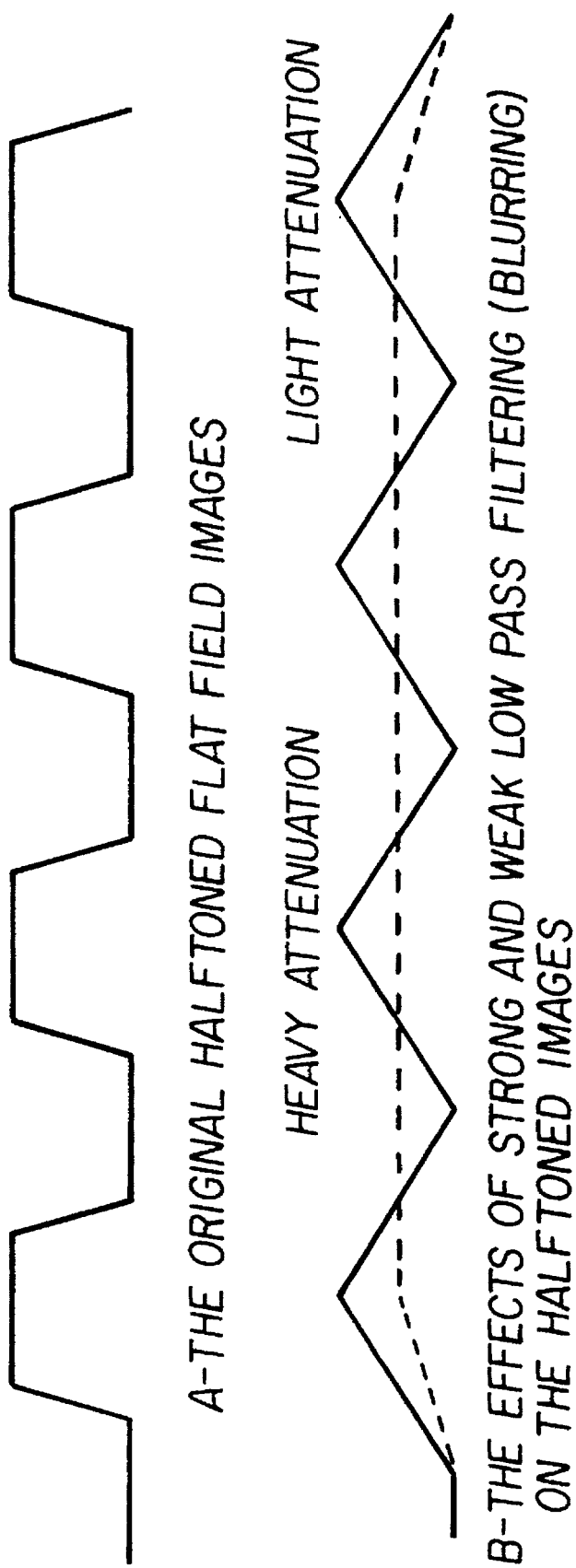
FIG. 9 is a series of waveforms illustrating the effect of the edge enhancer of FIGS. 2 and 3 when it is adjusted to process halftone images.

FIG. 9 graphically illustrates the effect of the blurring function with varying amounts of attenuation filtering. Signal "A" represents the reflection density of a halftoned flat field image. The signal "B" illustrates that with increasingly stronger filtering, edges are attenuated more and more until the halftone edges are eliminated. The resulting low-passed signal contains smooth edges reducing the effect of Moire patterns. Additionally, beat patterns known as Rossets or Moires patterns either present in the original or generated during the scanning process will effectively be reduced; because the edges in these patterns will be smoothed and as a result become less noticeable. Rossets are usually quite high in frequency and use of such a blurring function would most likely eliminate them without any loss when compared to the original image. This is because the cut-off frequency of low pass filter 92 is high enough so that no image-content related frequency will be filtered out. Because the original image is halftoned and the printing system will not edge enhance it, there is no chance that the image grain will be enhanced also. Therefore, the same low pass filter could be used for all three/or four colors and no boost or attenuation change is necessary.

FIG. 8 illustrates yet another embodiment showing how to reprogram or adjust edge enhancer 70 to perform edge attenuation. Because only the low pass filtering is required, only the first two elements of the entire edge enhancer will be needed. As noted in FIG. 8, switches 89 and 93 are open which prevents the original image signal being directed to image subtraction block 94. Thus, the original image signal passes through two-dimensional low pass filter 92 where the low pass image data signal is passed unaltered through image subtraction block 94 because nothing is subtracted because of switch 89 being open, the original image signal is shunted around amplification block 96 by closed shunt switch 95 directly to block 98 which passes the signal unaltered because switch 93 is open and prevents the original data signal from reaching block 98. Accordingly, no addition or subtraction takes place in block 98 and the low pass image data signal is outputted. The filter cut-off frequency and attenuation are commanded by the front end CPU 74, to perform different amounts of edge attenuation.

Advantages associated with this arrangement are more pleasing looking images which are reproduced from prints that were originally halftoned. Also, the beat patterns such as Rossels or Moire that originally existed on the print or were generated during the scanning process are eliminated or substantially reduced. No additional hardware is required to handle halftoned images as an input. The edge enhancement circuitry that is used to handling film as an input is merely reprogrammed to perform edge attenuation.

The invention has been described in detail with particular reference to preferred embodiments thereof, but it will be understood that variations and modifications can be effected within the spirit and scope of the invention.

I claim:

1. An image-forming method comprising:

receiving signals of color separation data in each of plural colors of an image to be reproduced:

effecting edge enhancement of the color separation data in each of the colors to generate edge enhanced color separation data for each of the colors wherein edge enhancement is provided in a different amount to the color separation data for each color;

in response to said edge enhanced color separation data, forming plural color separation images on an imaging member: and transferring the color separation images in resister to a receiver to form a multicolor image.

2. The method of claim 1 and wherein said step of effecting edge enhancement provides edge enhancement in a different amount to the color separation data in each color wherein the different amounts are related to improve transfer of the color separation images to the receiver.

3. The method of claim 2 and including the step of scanning photographic film to generate said signals of color separation data and wherein the type of film scanned is a factor in selecting an amount of edge enhancement.

4. The method of claim 1 and including the step of scanning photographic film to generate said signals of color separation data and wherein the type of film scanned is a factor in selecting an amount of edge enhancement.

5. An image-reproduction apparatus comprising:

a movable imaging member that is brought past a series of stations to create a series of color separation toner images that are transferred in registration to a receiver to create a multi-color reproduction of an image;

means for generating a first image data signal for each color separation of the image;

a two-dimensional low pass filter to filter the first image data signal for each color separation of the image to produce a low pass image data signal for each color separation of the image;

first subtraction means for subtracting for each color separation of the image the low pass image data signal from the first image data signal to produce a first hybrid data signal for each color separation of the image;

amplification means for amplifying said first hybrid data signal for each color separation of the image to produce an amplified hybrid data signal for each color separation of the image;

means for combining for each color separation of the image the amplified hybrid data signal with the first image data signal to form an image data signal with (a) edge enhancement when the image is from a continuous tone image, and (b) edge blurring when the image is from a halftone image;

electronic image forming means for forming a series of electrostatic separation images from said image data signal with edge enhancement or edge blurring on said movable imaging member for each color separation;

means for transferring said series of toner images in registration to a single receiver to create a multicolor reproduction of the image thereon; and means for providing different mounts of edge enhancement from one color separation to another for improving transfer of the toner images to the receiver in forming the multicolor reproduction of the image.

6. The apparatus of claim 5 and wherein said amplification means provides negative boost when amplifying said first hybrid data signal in response to image being a halftone image.

7. The apparatus of claim 5 and wherein said means for combining provides
   (a) a subtraction operation when said first image data signal is from a continuous tone image; and
   (b) an addition operation when said first image data signal is from a halftone image.

8. The apparatus of claim 7 including means for scanning the image to generate the first image data signals.

9. An image-reproduction method comprising:
   generating a first image data signal for each color separation of an image to be reproduced;
   filtering the first image data signal for each color separation of the image to produce a low pass image data signal for each color separation of the image;
   subtracting for each color separation of the image the low pass image data signal from the first image data signal to produce a first hybrid data signal for each color separation of the image;
   amplifying said first hybrid data signal for each color separation of the image to produce an amplified hybrid data signal for each color separation of the image;
   combining for each color separation of the image the amplified hybrid data signal with the first image data signal to form an image data signal with
      (a) edge enhancement when the image is from a continuous tone image, and
      (b) edge blurring when the image is from a halftone image;
   forming means for forming a series of electrostatic separation images from said image data signal with edge enhancement or edge blurring on a movable imaging member for each color separation;
   transferring said series of toner images in registration to a single receiver to create a multicolor reproduction of the image; thereon; and
   adjusting the amount of edge enhancement from one color separation to another for reproducing the image.

10. The method of claim 9 and wherein said amplifying provides negative boost when amplifying said first hybrid data signal in response to the image being a halftone image.

11. The method of claim 9 and including providing different amounts of edge enhancement from one color separation to another for improving transfer of the toner images to the receiver in forming the multicolor reproduction of the image.

12. The method of claim 11 and wherein the step of combining provides
   (a) a subtraction operation when said first image data signal is from a continuous tone image; and
   (b) an addition operation when said first image data signal is from a halftone image.

13. The method of claim 9 and including the step of scanning the image to generate the first image data signals and adjusting the mount of edge enhancement from one color separation to another in accordance with type of film scanned.

14. The method of claim 13 and including providing different amounts of edge enhancement from one color separation to another for improving transfer of the toner images to the receiver in forming the multicolor reproduction of the image.

15. An image-forming apparatus comprising an imaging member movable past a series of electrographic stations to create a series of color toner images that are transferred in registration to a receiver to create a multicolor image, said apparatus including:
   means for scanning an original continuous tone image to provide color separation original image data for each of plural separation colors;
   variable means for effecting edge enhancement to color separation image data wherein different amounts of edge enhancement are applied to the image data for each of the plural separation colors to generate edge enhanced color separation image data;
   electronic exposure means for forming a series of electrostatic separation images from said edge attenuated color separation image data on said movable imaging member;
   means for developing the electrostatic separation images with toner of different colors to form a series of colored toner images; and
   means for transferring said series of toner images in registration to a single receiver to create a multi-color image thereon.

16. The image-forming apparatus set forth in claim 15 wherein the variable means is effective to reduce the amount of edge enhancement for each subsequent color separation.

17. The image-forming apparatus set forth in claim 15 wherein the variable means is effective to reduce the amount of edge enhancement by approximately 5% for each subsequent electrostatic separation.

18. The image-forming apparatus set forth in claim 15 wherein the variable means further includes the use of a two-dimensional low pass filter to filter the original image data to produce a low pass image data signal.

19. The image-forming apparatus set forth in claim 18 wherein the variable means further includes first image subtraction means for subtracting the low pass image data signal from the original image data to produce a first hybrid data signal.

20. The image-forming apparatus set forth in claim 19 wherein the variable means further includes amplification means for amplifying said first hybrid data signal to generate an amplified hybrid data signal.

21. The image-forming apparatus set forth in claim 20 wherein the variable means further includes second image subtraction means for subtracting the amplified hybrid data signal from said original image data.

22. An image-forming apparatus comprising an imaging member movable past a series of electrographic stations to create a series of color toner images that are transferred in registration to a receiver to create a multicolor image, said apparatus including:
   means for scanning an original halftone image to provide color separation original image data for each of plural separation colors;
   variable means for effecting edge attenuation to color separation image data wherein a different mount of edge attenuation is applied to the image data of each of the plural separation colors to generate edge attenuated color separation image data;
   electronic exposure means for forming a series of electrostatic separation images from said edge attenuated color separation image data on said movable imaging member;

means for developing the electrostatic separation images with toner of different colors to form a series of colored toner images; and means for transferring said series of toner images in registration to a single receiver to create a multi-color image thereon.

23. The image-forming apparatus set forth in claim 22 wherein the variable means further includes the use of a two-dimensional low pass filter to filter the original image data to produce a low pass image data signal.

24. The image-forming apparatus set forth in claim 23 wherein the variable means further includes image subtraction means for subtracting the low pass image data signal from the original image data to produce a first hybrid data signal.

25. The image-forming apparatus set forth in claim 24 wherein the variable means further includes amplification means for amplifying said first hybrid data signal.

26. The image-forming apparatus set forth in claim 25 wherein the variable means further includes addition means for adding said amplified first hybrid data signal to said original image data.

27. An image-forming apparatus comprising:

means for receiving signals of color separation data in each of plural colors of an image to be reproduced;

means for effecting edge enhancement of the color separation data in each of the colors to generate edge enhanced color separation data for each of the colon wherein edge enhancement is provided in a different amount to the color separation data for each colors;

means, responsive to said edge enhanced color separation data, for forming plural color separation images on an imaging member, and means for transferring the color separation images in register to a receiver to form a multicolor image.

28. The apparatus of claim 27 and wherein said means for effecting edge enhancement provides edge enhancement in a different amount to the color separation data in each color wherein the different amounts are related to improve transfer of the color separation images to the receiver.

29. An image-forming method comprising moving an imaging member past a series of electrographic stations to create a series of color toner images that are transferred in registration to a receiver to create a multicolor image, said method including:

scanning an original continuous tone image to provide color separation original image data for each of plural separation colors;

effecting edge enhancement to color separation image data wherein a different amount of edge enhancement is applied to the image data for each of the plural separation colors to generate edge enhanced color separation image data;

forming a series of electrostatic separation images from said edge enhanced color separation image data on said movable imaging member;

developing the electrostatic separation images with toner of different colors to form a series of colored toner images; and transferring said series of toner images in registration to a single receiver to create a multi-colored image thereon.

30. The method of claim 29 and wherein said step of effecting edge enhancement provides edge enhancement in a different amount to the color separation data in each color wherein the different amounts arc related to improve transfer of the color separation images to the receiver.

31. The method of forming a reproduction of an image as set forth in claim 30 wherein the amounts of edge enhancement applied to said image data is reduced for each subsequent color separation.

32. The method of forming an image as set forth in claim 29 wherein the original image data is passed through a two-dimensional low pass filter to produce a low pass image data signal; said low pass image data signal is subtracted from the image data to produce a first hybrid signal; said first hybrid data signal is amplified to produce an amplified first hybrid data signal; and therein said amplified first hybrid data signal is added to said original image data signal.

33. A method of forming a reproduction of an image comprising:

scanning an original continuous tone image to provide color separation image data for each of plural colors;

applying a varying amount of edge enhancement to said image data for each color of color separation image data wherein the amounts are related to improve transfer of the toner images to the receiver;

exposing, in response to edge enhanced image data, a movable imaging member to form a series of electrostatic separation images from said edge enhanced image data for each color separation;

transferring said series of toner images in registration to a single receiver to create a multi-color reproduction of the image thereon.

34. The method of forming a reproduction of an image as set forth in claim 33 wherein edge enhancement is reduced by approximately 5% for each subsequent color separation.

35. The method of forming a reproduction of an image as set forth in claim 33 wherein the color separation image data is passed through a two-dimensional low pass filter to produce a low pass image data signal.

36. The method of forming a reproduction of an image as set forth in claim 35 wherein the low pass image data signal is subtracted from the color separation image data to produce a first hybrid data signal; said first hybrid data signal is amplified to produce an amplified first hybrid data signal; and said amplified first hybrid data signal is subtracted from said original image data signal.

* * * * *